(12) United States Patent
Wilson

(10) Patent No.: US 10,708,569 B2
(45) Date of Patent: Jul. 7, 2020

(54) TURBINE-POWERED POOL SCRUBBER

(71) Applicant: Eric Wilson, Glendale, AZ (US)

(72) Inventor: Eric Wilson, Glendale, AZ (US)

( * ) Notice: Subject to any disclaimer, the term of this patent is extended or adjusted under 35 U.S.C. 154(b) by 87 days.

(21) Appl. No.: 15/690,522

(22) Filed: Aug. 30, 2017

(65) Prior Publication Data
US 2018/0087286 A1 Mar. 29, 2018

Related U.S. Application Data

(60) Provisional application No. 62/401,754, filed on Sep. 29, 2016.

(51) Int. Cl.
| | |
|---|---|
| *B24B 23/02* | (2006.01) |
| *E04H 4/16* | (2006.01) |
| *H04N 13/117* | (2018.01) |
| *H04N 21/6587* | (2011.01) |
| *H04N 21/81* | (2011.01) |
| *H04N 21/24* | (2011.01) |
| *H04N 21/2343* | (2011.01) |
| *F03B 3/18* | (2006.01) |
| *F03B 15/06* | (2006.01) |
| *H04N 13/178* | (2018.01) |
| *H04N 13/194* | (2018.01) |
| *H04N 13/388* | (2018.01) |
| *F03B 3/02* | (2006.01) |
| *F03B 3/06* | (2006.01) |

(Continued)

(52) U.S. Cl.
CPC ........... *H04N 13/117* (2018.05); *B24B 23/02* (2013.01); *B24B 23/026* (2013.01); *E04H 4/16* (2013.01); *E04H 4/1618* (2013.01); *E04H 4/1645* (2013.01); *F03B 3/18* (2013.01); *F03B 15/06* (2013.01); *H04N 13/178* (2018.05); *H04N 13/194* (2018.05); *H04N 13/388* (2018.05); *H04N 21/23439* (2013.01); *H04N 21/2402* (2013.01); *H04N 21/6587* (2013.01); *H04N 21/816* (2013.01); *F03B 3/02* (2013.01); *F03B 3/06* (2013.01); *F05B 2220/70* (2013.01); *H04N 13/161* (2018.05); *H04N 13/373* (2018.05); *H04N 13/376* (2018.05); *H04N 13/378* (2018.05); *H04N 13/38* (2018.05)

(58) Field of Classification Search
CPC ......... B24B 23/02; B24B 23/026; E04H 4/16; E04H 4/1618; E04H 4/1636; E04H 4/1645
USPC .................................................. 451/344, 354
See application file for complete search history.

(56) References Cited

U.S. PATENT DOCUMENTS

| | | | |
|---|---|---|---|
| 3,291,145 A * | 12/1966 | Arneson ............... | E04H 4/1681 134/167 R |
| 4,004,312 A * | 1/1977 | Eason ................... | A46B 13/06 15/29 |

(Continued)

*Primary Examiner* — Eileen P Morgan
(74) *Attorney, Agent, or Firm* — Thomas W. Galvani, P.C.; Thomas W. Galvani

(57) ABSTRACT

A pool cleaning tool includes a front housing and a rear housing coupled together, an intake, an outlet, a turbine disposed within the front and rear housings, and a three-way diverter valve proximate the intake. The tool includes an abrasive member, rigidly coupled to the turbine, mounted outside the front and rear housings for rotation with the turbine. The three-way diverter valve has an on position in which water drawn into the intake is communicated into the tool, up to the turbine, and then out the outlet, thereby imparting rotation to the turbine and to the abrasive member.

17 Claims, 4 Drawing Sheets

(51) Int. Cl.
*H04N 13/376* (2018.01)
*H04N 13/378* (2018.01)
*H04N 13/161* (2018.01)
*H04N 13/38* (2018.01)
*H04N 13/373* (2018.01)

(56) References Cited

U.S. PATENT DOCUMENTS

| | | | | |
|---|---|---|---|---|
| 4,193,228 A * | 3/1980 | Bowler | ................ | B24B 23/026 |
| | | | | 15/1.7 |
| 4,335,481 A * | 6/1982 | Slayman | ................ | A46B 13/04 |
| | | | | 15/29 |
| 4,463,525 A * | 8/1984 | Sheber | ................ | B08B 1/04 |
| | | | | 15/1.7 |
| 4,558,479 A * | 12/1985 | Greskovics | ........... | E04H 4/1654 |
| | | | | 15/1.7 |
| 4,780,992 A * | 11/1988 | McKervey | ............ | A47L 11/145 |
| | | | | 15/1.7 |
| 4,881,978 A * | 11/1989 | Van Horssen | ......... | B08B 7/022 |
| | | | | 134/16 |
| 5,038,523 A * | 8/1991 | Farber | ................ | B24B 23/026 |
| | | | | 15/1.7 |
| 5,044,034 A * | 9/1991 | Iannucci | ............... | E04H 4/1636 |
| | | | | 15/1.7 |
| 7,288,022 B2 * | 10/2007 | Bacon | ................ | B24B 23/026 |
| | | | | 451/295 |
| 7,437,790 B1 * | 10/2008 | Ajello | ................ | E04H 4/1636 |
| | | | | 15/1.7 |
| 10,399,218 B2 * | 9/2019 | Elen | ................ | B24B 23/005 |
| 2006/0053572 A1 * | 3/2006 | Porat | ................ | C02F 1/4674 |
| | | | | 15/1.7 |
| 2015/0059106 A1 * | 3/2015 | Rief | ................ | E04H 4/1672 |
| | | | | 15/1.7 |
| 2017/0356211 A1 * | 12/2017 | Rejniak | ................ | E04H 4/1654 |

* cited by examiner

TURBINE-POWERED POOL SCRUBBER

FIELD OF THE INVENTION

This invention relates in general to cleaning devices and, more particularly, to cleaning devices which harness hydro power from the pool pump and filter system's suction hose.

BACKGROUND OF THE INVENTION

Although a great number of highly sophisticated and complex devices have been developed for cleaning the water in swimming pools, only a few rudimentary implements are available for removing the calcium and lime deposits, oils, grease, scum and the like which tend to build up on the tile walls of pools, along with plaster stains below the tile. These implements include pumice stones, hand-held scrub brushes, and various chemical cleansers or abrasives which the pool owner must rub onto the tile surface, generally while standing in the pool or while kneeling or crouching on its edge. Unfortunately, the laborious nature of this hand-scrubbing process tends to dissuade people from cleaning their tiles as frequently as they should. Thus, the layer of accumulated deposits becomes thicker and harder to remove with time, resulting in added labor and aggravation for the owner of the pool.

One prior art attempt to solve this problem is described in U.S. Pat. No. 4,004,312 to Eason, which relates to a tool for washing concrete surfaces and swimming pool walls. The tool of Eason includes a round brush member rotatable disposed within a hollow open-ended housing. A hollow tubing portion with a handle element formed at one end is affixed to the housing, with the longitudinal axis of the tubing.

U.S. Pat. No. 3,755,845 to Coult provides a frictional driven rotating cleaning apparatus wherein manual directing of the apparatus imparts rotation to an associated brush within the apparatus.

U.S. Pat. No. 396,473 to Bell uses a hand-held grill cleaner wherein a brush is rotatably mounted to a lowermost forward end of the apparatus.

U.S. Pat. No. 4,324,015 to Head sets forth a repositionable tile cleaner wherein the apparatus includes a housing mounted upon a castor for repositioning of the apparatus about the swimming pool apron, with a downwardly directed rotatable brush for cleaning of the pool tile.

U.S. Pat. No. 4,780,992 to McKervey provides an apparatus for swimming pool tile cleaning wherein a hand-held tool in the shape of a "L" configuration includes a downwardly directed rotatable brush for cleaning of tile adjacent swimming pool apron, with an injector organization to direct a cleaning fluid to the surface of the rotating brush.

Portion also includes a fitting for attaching a hose to communicate fluids thereto. To operate the tool, fluid from the hose is directed through the tubing element and on to a plurality of fin elements provided on the back of the brush member, imparting rotation thereto. One problem with Eason's device is that the angle of the brush member relative to the handle makes the tool more suitable for cleaning horizontal surfaces such as pool floors than for the vertical walls of a pool. Another problem with the device is that it requires attachment to a source of pressurized water, which increases the weight of the tool and limits the amount of distance over which the tool can be carried. Still another problem with the device is that it lacks versatility; i.e., it can only be used for cleaning certain types of surfaces, and thus may not merit its cost to the consumer.

U.S. Pat. No. 1,578,013 to Case, U.S. Pat. No. 4,202,068 to Lester et al, U.S. Pat. No. 4,208,753 to Lewis, and U.S. Pat. No. 4,237,570 to Brock. All of the above relate to tools having rotary brushes suitable for a wide variety of uses such as scrubbing and polishing of floors, utensils, and furniture, and cleaning the exterior surface of automobiles and airplanes. However, none of these prior art cleaning devices would be suitable for use on swimming pool tile, for a variety of reasons. For instance, a number of the devices are electrically powered, which makes them hazardous to use near water. Others are pneumatically or hydraulically powered, which requires connection to a remote source of pressurized air or water. In addition, the brush angles make them inconvenient for use on vertical walls. Still further, like the device of Eason, they are limited to a single basic function, and would cost more than their occasional use by a pool owner would justify.

As such, it may be appreciated that there continues to be need for a new and improved swimming pool tile and plaster stain cleaning apparatus which can be easily and efficiently manufactured and marketed

SUMMARY OF THE INVENTION

Generally, a hand-held tool uses a turbine to rotate an abrasive pad to clean plaster stains from pool tile. This embodiment is effective for removing especially thick solid deposits of calcium and plaster stains which do not respond to treatment with a bristle-type brush.

The above provides the reader with a very brief summary of some embodiments discussed below. Simplifications and omissions are made, and the summary is not intended to limit or define in any way the scope of the invention or key aspects there-of Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Figure 1:
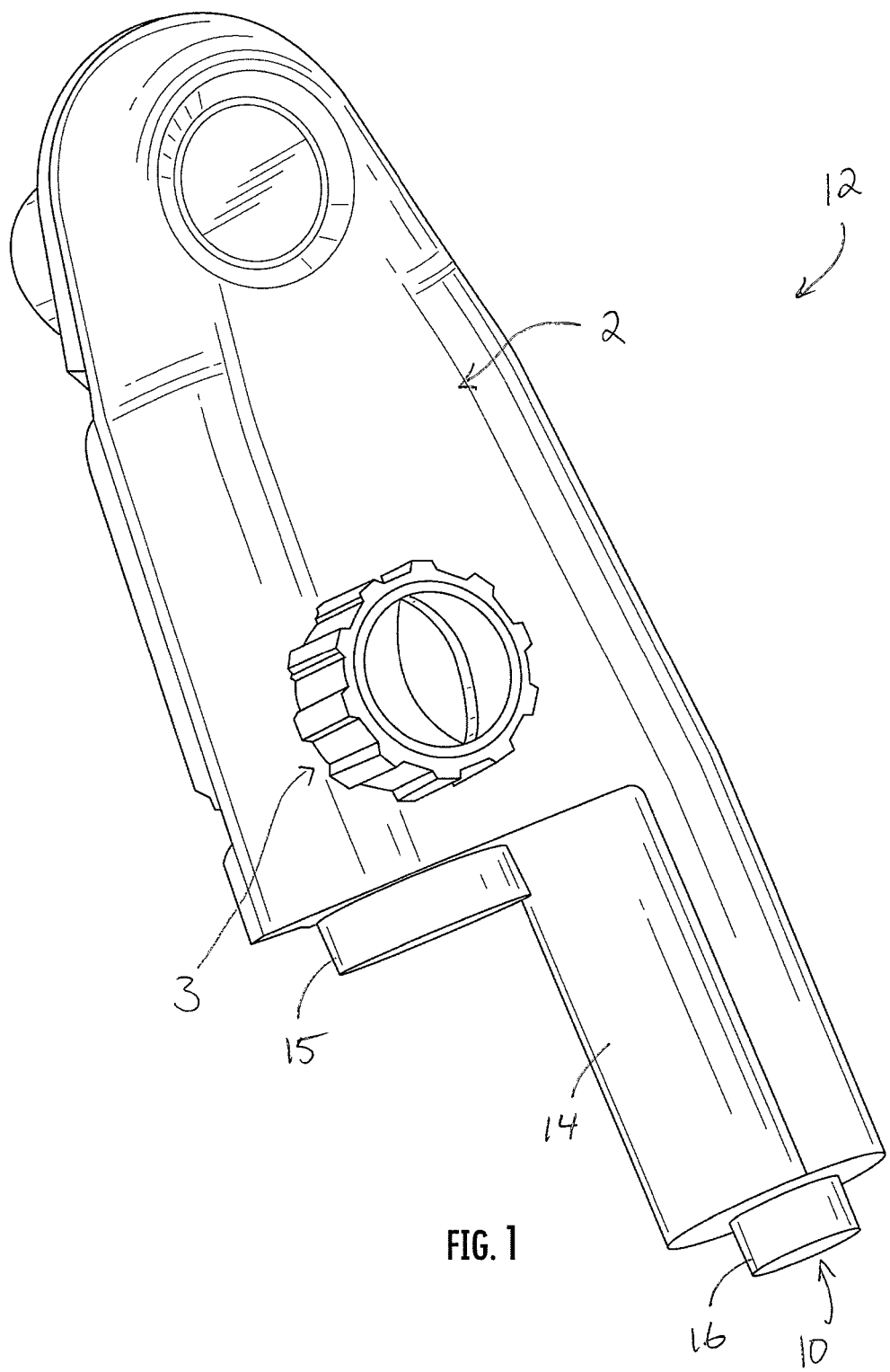
FIG. 1 is a rear perspective view of the cleaning apparatus of the present invention with the three-way diverter valve in the "ON" position.
Figure 2:
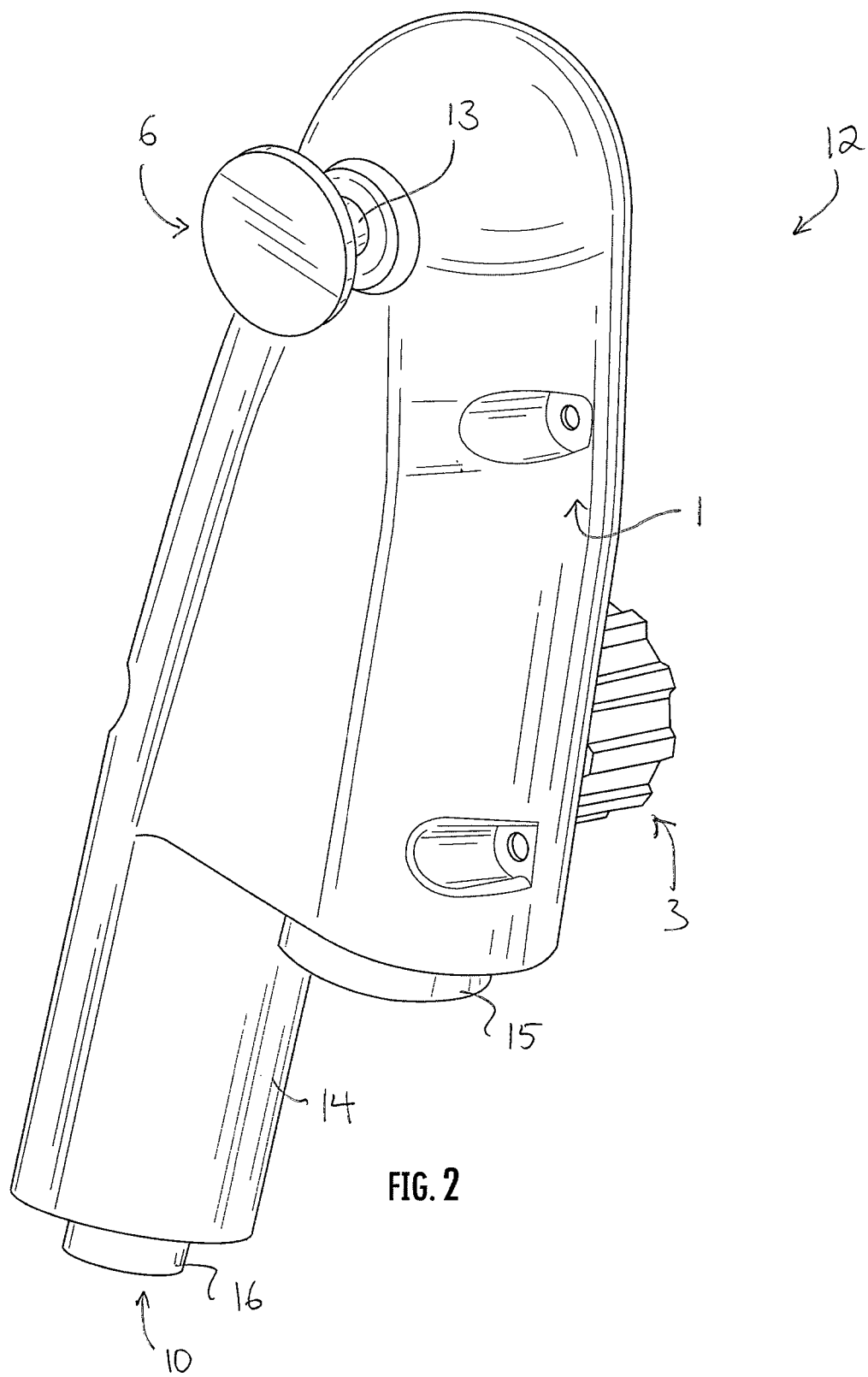
FIG. 2 is a top perspective view of the cleaning apparatus of the present invention with the detachable abrasive member attached.
Figure 3:
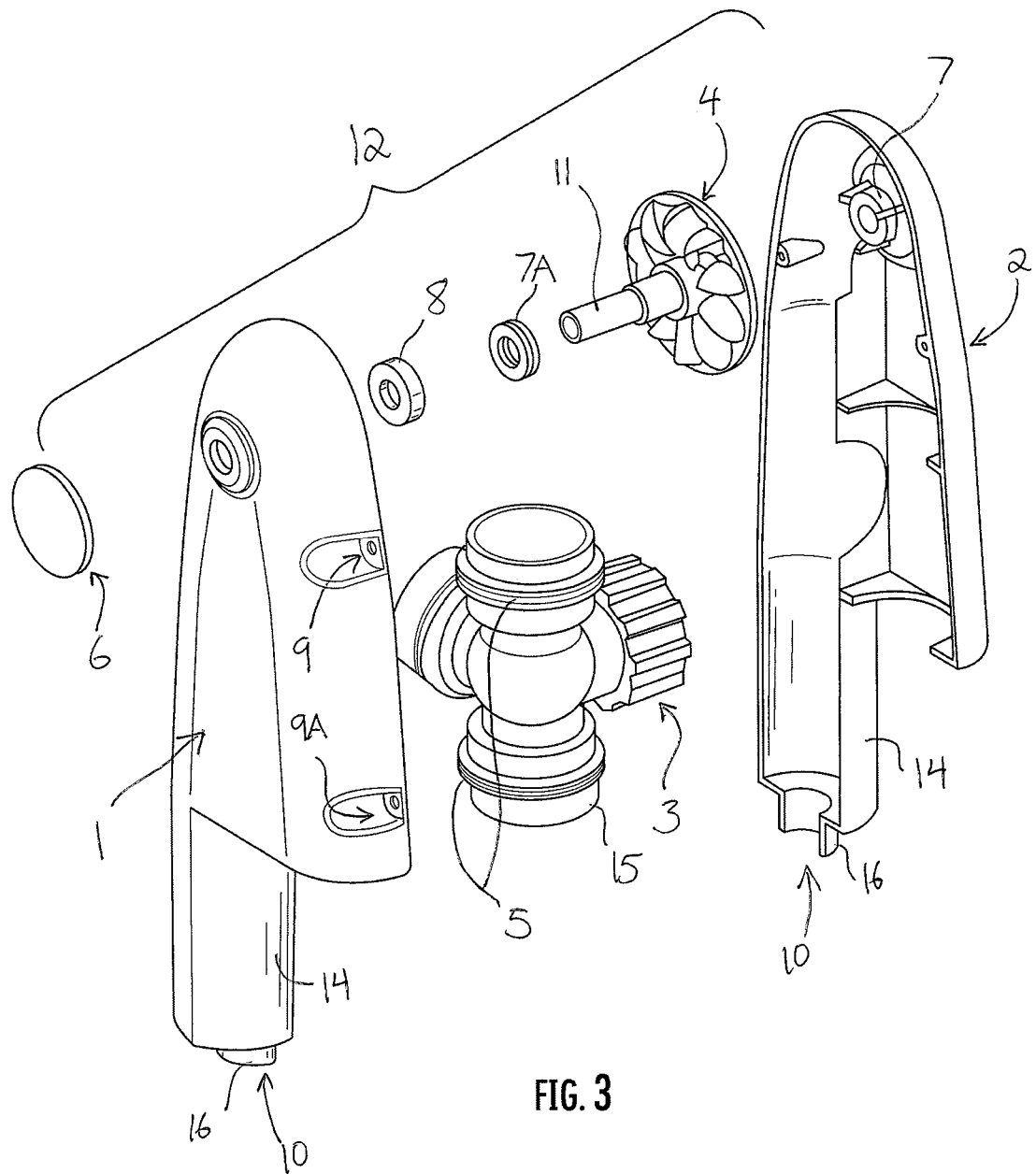
FIG. 3 is an exploded view showing the internal workings of the present invention, including a: 1 Front housing of the turbine cleaner; 2 Rear housing of the turbine cleaner; 3 a three-way diverter valve; 4 H2O Turbine; 5 Grommet; 6 Detachable abrasive member; 7 Rear turbine bearing; 7A Front turbine bearing; 8 Silicone rubber seal; and 9 and 9A self-tapping screw pilot holes.
Figure 4:
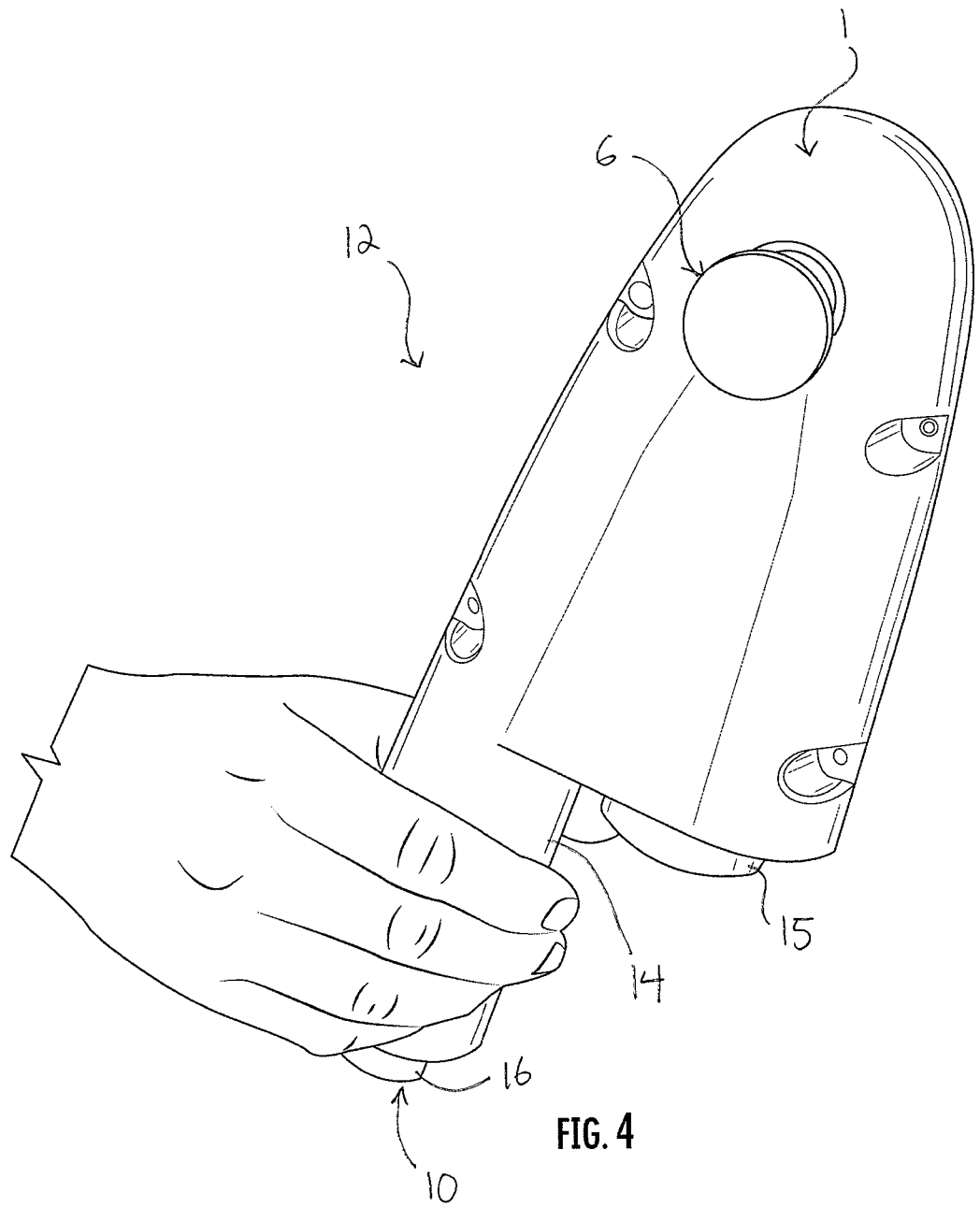
FIG. 4 is a front perspective view of the bottom of the invention with call-outs for the hose connections 10. When the suction hose from the pool filter is applied to the outlet 16 the water is drawn up through the 11. The pool water intake 15 which will activate the rotation of the H2O Turbine.

Reference is now made to the drawings, in which the same reference characters are used throughout the different figures to designate the same elements. FIGS. 1-4 illustrate a new and improved hand-held cleaning tool 12 which uses available hydro power of the pool pump and filter system and a detachable abrasive member 6. As identified in the description of the drawings, the tool includes a front housing 1, a rear housing 2, a three-way diverter valve 3 (such as a ball valve, butterfly valve, spear valve, gate valve, diaphragm valve, globe valve, check valve, and solenoid valve), a hydro or water turbine 4 (such as react turbines including a VLH turbine, Kaplan turbine, propeller turbine, bulb turbine, Straflo turbine, Tyson turbine, and Gorlov turbine, or impulse turbines including a waterwheel turbine, Pelton turbine, Turgo turbine, Crossflo turbine, Michell turbine, Banki turbine, Ossberger turbine, Jonval turbine, reverse overshot turbine, Archimedes screw turbine, and Barkh turbine), a grommet 5, a detachable abrasive member 6, a rear turbine bearing 7, a front turbine bearing 7A, a silicone rubber seal 8, and self-tapping screw pilot holes 9 and 9A. The abrasive member 6 is adapted to be and is actually connected to the shaft 11 of the hydro turbine 4. In this preferred embodiment, the abrasive member 6 is threaded directly into the hydro turbine 4 shaft 11 housed in the handheld tool 12. The abrasive member 6 may use various grades of abrasion and has a substantially cylindrical and/or flat outer surface. The abrasive member 6 is mounted on the drive shaft 11 of the hydro turbine 4 and/or a chuck to secure the detachable abrasive member 6. This embodiment of the invention is effective for removing especially thick solid deposits of calcium and plaster stains which do not respond to treatment with a bristle-type brush.

To use the tool 12 for cleaning the vertical side tile walls of a swimming pool, it is most beneficial for the operator to stand in the pool in order for the abrasive member 6 to have direct contact with the surface being cleaned. It is preferred that the abrasive member 6 be above pool water level. The operator actuates the hydro powered turbine 4 by controlling the three-way diverter valve 3 on the device in order to rotate the abrasive member 6. FIG. 1 illustrates the three-way diverter valve 3 in the "ON" position; when a suction hose extending from the pool pump and filter system is applied to the outlet 16 and the pump system is activated, the water is drawn up through the pool water intake 15. Water is drawn up through the intake 15, into the tool 12 between the front and rear housings 1 and 2, up to an end of the tool 12 which is opposite the intake 15 (and which is where the turbine 4 is located), and then back down and out the outlet 16, moving substantially parallel to and in an opposite direction to the water drawn into the tool 12 at the intake 15. This movement of water activates the rotation of the turbine 4. The operator may control the RPM or revolutionary speed of the turbine with the three-way diverter valve 3, moving from a diverted position, in which the water is not passed up to the turbine The operator may then move the tool 12 slowly around the perimeter of the pool until the desired perimeter of the pool has been cleaned. In order to clean different types of surfaces, the operator may substitute different types of abrasive members 6 and may hold the tool handle 14 (as shown in hand in FIG. 4) in different positions relative to the surface. The interchangeable abrasive members 6 include various grade types for the removal of calcium build-up to polishing pool tile.

I claim as my invention:

1. A pool cleaning tool powered by a suction hose of a pool pump and filter, the tool comprising:
    front and rear housings coupled together, to form a tool body including an intake and an outlet, the tool including a turbine disposed within the tool body, and a three-way diverter valve disposed within the tool body proximate the intake;
    an abrasive member, coupled to the turbine via a shaft that extends from the turbine through the tool body, the abrasive member mounted proximate to the turbine but outside the tool body for rotation with the turbine; and
    the three-way diverter valve has an on position in which, when the tool is in use, water drawn into the intake via suction is communicated into the tool body and directed past the turbine, and then out the outlet coupled to the suction hose, thereby imparting rotation to the turbine and to the abrasive member;
    wherein the intake and outlet are directed with a same orientation;
    the intake is spaced apart from the turbine; and
    a handle, comprising an extension of the tool body, spaces the outlet apart from the turbine further, in a common direction, than the intake is spaced apart from the turbine.

2. The tool of claim 1, wherein the intake and outlet are both disposed at one end of the tool body.

3. The tool of claim 1, wherein the turbine is located in the tool body at an end thereof, the end located on the tool body opposite both the intake and the outlet.

4. The tool of claim 1, wherein, when water is communicated into the tool, water moves in a first direction from the intake to the turbine, and then in a second direction from the turbine to the outlet, wherein the first and second directions are substantially parallel and opposite.

5. The tool of claim 1, wherein the handle is formed by the front and rear housings and the outlet is located in the handle.

6. The tool of claim 1, wherein the abrasive member is rigidly connected to the shaft.

7. A pool cleaning tool powered by a suction hose of a pool pump and filter system, the tool comprising:
    front and rear housings coupled together to form a tool body including an intake and an outlet for coupling to the suction hose, the toolin including both a turbine and a three-way diverter valve disposed within the tool body;
    an abrasive member, coupled to the turbine via a shaft that extends from the turbine through the tool body, the abrasive member mounted proximate to the turbine but outside the tool body for rotation with the turbine; and
    the three-way diverter valve has an on position in which, when the tool is in use, water drawn into the intake via suction is communicated into the tool body and toward the turbine, where said water passes the turbine, turns, and is communicated toward the outlet coupled to the suction hose;
    wherein the turbine rotates in response to the water passing the turbine, thereby imparting rotation to the abrasive member;
    wherein the intake and outlet are directed with a same orientation;
    the intake is spaced apart from the turbine; and
    a handle, comprising an extension of the tool body, spaces the outlet apart from the turbine further, in a common direction, than the intake is spaced apart from the turbine.

8. The tool of claim 7, wherein the intake and outlet are both disposed at one end of the tool body.

9. The tool of claim 7, wherein the turbine is located in the tool body at an end thereof, the end located on the tool body opposite both the intake and the outlet.

10. The tool of claim 7, wherein, when water is communicated into the tool, water moves in a first direction from the intake to the turbine, and then in a second direction from the turbine to the outlet, wherein the first and second directions are substantially parallel and opposite.

11. The tool of claim 7, wherein the handle is formed by the front and rear housings, and the outlet is located in the handle.

12. The tool of claim 7, wherein the abrasive member is rigidly connected to the shaft.

13. A pool cleaning tool powered by a suction hose of a pool pump and filter system, the tool comprising:
- a tool body having an intake and an outlet, the tool including a turbine disposed within the tool body between the intake and outlet;
- the turbine is at one end of the tool body, and the intake and outlet are at an opposite end of the tool body;
- a shaft extends from the turbine to outside the tool body; and
- an abrasive member is mounted on the shaft, so mounted for rotation in response to rotation of the turbine when water is communicated through the tool body from the intake to the outlet;
- wherein the intake and outlet are directed with a same orientation;
- the intake is spaced apart from the turbine; and
- a handle, comprising an extension of the tool body, spaces the outlet apart from the turbine further, in a common direction, than the intake is spaced apart from the turbine.

14. The tool of claim 13, wherein, when the tool is in use, water flows in one part of the tool body from the intake through a three-way valve toward the turbine in one direction and then flows in an opposite direction in another part of the tool body from the turbine toward the outlet.

15. The tool of claim 14, wherein the water flowing in the one direction is substantially parallel to the water flowing in the opposite direction.

16. The tool of claim 14, wherein the water turns direction from the intake to the outlet at the turbine.

17. The tool of claim 13, wherein the outlet is located in the handle.

\* \* \* \* \*